United States Patent

Matsushima

[11] Patent Number: 5,937,211
[45] Date of Patent: Aug. 10, 1999

[54] CAMERA

[75] Inventor: Hiroshi Matsushima, Tokyo, Japan

[73] Assignee: Canon Kabushiki Kaisha, Tokyo, Japan

[21] Appl. No.: 08/779,249

[22] Filed: Jan. 3, 1997

Related U.S. Application Data

[63] Continuation of application No. 08/308,670, Sep. 19, 1994, abandoned.

[30] Foreign Application Priority Data

Sep. 24, 1993 [JP] Japan .................................. 5-237668

[51] Int. Cl.$^6$ .............................. G03B 39/04; G01D 9/42
[52] U.S. Cl. ......................... 396/11; 396/287; 346/107.2
[58] Field of Search .................................. 354/347, 346,
354/94, 159, 222, 66, 71, 271.1, 73, 289.12,
474; 346/107.2; 396/212, 242, 265, 281,
287, 291, 387, 11; 348/334, 333, 157, 161,
148, 143, 145; 352/81, 162

[56] References Cited

U.S. PATENT DOCUMENTS

| | | | |
|---|---|---|---|
| 2,599,517 | 6/1952 | Raspet | 354/66 |
| 3,224,328 | 12/1965 | Leistner | 355/50 |
| 3,532,039 | 10/1970 | Rising | 354/71 |
| 3,608,453 | 9/1971 | Dirksen et al. | 354/66 |
| 4,190,340 | 2/1980 | Maida | 354/173 |
| 4,200,385 | 4/1980 | Shono | 354/233 |
| 4,505,559 | 3/1985 | Prinz | 354/66 |
| 4,593,982 | 6/1986 | Rosset | 354/99 |
| 4,600,283 | 7/1986 | Gorsch et al. | 354/66 |
| 4,692,008 | 9/1987 | Arakawa et al. | 354/217 |
| 4,697,901 | 10/1987 | Wakabayashi | 354/221 |
| 4,797,751 | 1/1989 | Yamaguchi | 358/335 |
| 4,861,157 | 8/1989 | Ohama et al. | 352/132 |
| 4,943,821 | 7/1990 | Gelphman et al. | 354/99 |
| 4,956,656 | 9/1990 | Yamamoto et al. | 354/173.1 |
| 5,049,909 | 9/1991 | Ishikawa et al. | 354/173.1 |
| 5,223,888 | 6/1993 | Fukahori | 354/475 |
| 5,243,476 | 9/1993 | Hong | 360/73.02 |
| 5,315,331 | 5/1994 | Ohshita | 354/94 |
| 5,365,302 | 11/1994 | Kodama | 354/403 |

*Primary Examiner*—Safet Metjahic
*Assistant Examiner*—Christopher E. Mahoney
*Attorney, Agent, or Firm*—Robin, Blecker & Daley

[57] ABSTRACT

A camera includes a first control part arranged to make an exposure by operating a shutter with a film stopped, a second control part arranged to make a slit exposure by moving the film with the shutter opened, and a selection switch provided for selecting either the first control part or the second control part. Additionally, a segment display varies in response to film movement during slit exposure.

11 Claims, 8 Drawing Sheets

502a 502

CAMERA

This is a continuation application under 37 CFR 1.62 of prior application Ser. No. 08/308,670 filed on Sep. 19, 1994 (abandoned).

BACKGROUND OF THE INVENTION

1. Field of the Invention

This invention relates to a camera arranged to permit a slit exposure.

2. Description of the Related Art

A sequence of photographing actions of cameras practiced in general is as follows. In the case of a single-lens reflex camera, for example, when a shutter release switch is turned on, a group of leading shutter blades are allowed to travel after a mirror is moved up. Then, after the lapse of time corresponding to a set shutter time, a group of trailing shutter blades are allowed to travel to terminate an exposure of a film surface. The portion of film thus exposed is moved to a predetermined extent to permit a next shot.

The exposure of the film surface, in this case, is effected by moving a slit formed between the leading and trailing shutter blade groups with respect to a stationary surface of each of frame portions of the film. Therefore, in the event of a horse race or a car race, for example, it is only a state of one moment that can be photographed. The horses or cars which are passing a goal one after another cannot be covered by a single photograph.

To make such objects photographable, practice has been to time-serially expose the film surface for these objects by conversely arranging a slit to be stationary relative to the film surface and the film to be moved relative to the slit. Hereinafter, this exposure effecting method will be referred to as a slit exposure.

In the slit exposure, the length of film for one frame is determined by the feeding length of film and often differs from ordinary image plane sizes including 24×36 mm, a panorama size and a size called "high-vision" size. The shots taken by the slit exposure, therefore, are excluded from standard printing sizes and cannot be printed by ordinary low-priced standard printing service facilities. Further, ordinary standard photographic goods, such as film cases, picture frames, etc., are not usable for such shots.

It has been another problem that, in taking a shot by the slit exposure, the moving speed of a film necessary for obtaining an apposite amount of exposure is decided by computing a moving distance, on the film surface, of the object of shooting from the moving speed of the object, the object distance and the focal length of a lens in use.

Further, if the moving speed of a film varies while the slit exposure is still in process, the amount of film exposure also varies to result in an uneven exposure.

SUMMARY OF THE INVENTION

One aspect of this invention resides in the provision of a camera which is arranged to permit change-over between an ordinary exposure and a slit exposure, to bring the film to a stop in taking a shot in the ordinary exposure mode and to cause the film to move in taking a shot in the slit exposure mode.

Another aspect of this invention resides in the provision of a camera having a mark which is arranged to move according to a speed at which the film is caused to move for a slit exposure, in such a manner that the moving speed of the film can be easily adjusted to the moving speed of an object to be photographed.

These and other aspects and features of this invention will become apparent from the following detailed description of embodiments thereof taken in connection with the accompanying drawings.

DETAILED DESCRIPTION OF THE PREFERRED EMBODIMENTS

Figure 1:
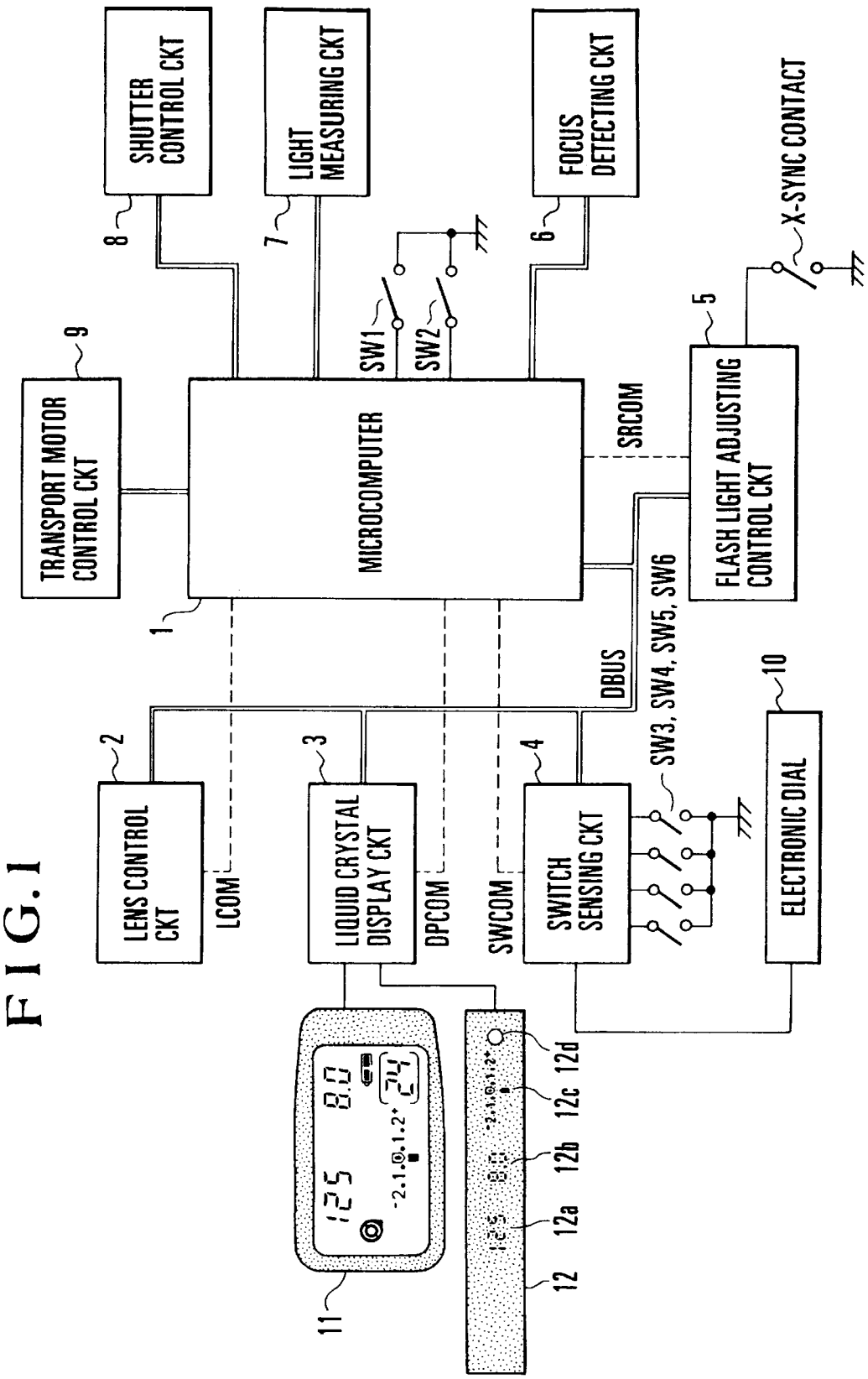
FIG. 1 is a block diagram showing the electric control circuit of a camera arranged as an embodiment of this invention.

FIG. 1 shows in a block diagram the electric control circuit of a camera arranged according to this invention as an embodiment thereof. Referring to FIG. 1, a microcomputer 1 is arranged to control the movement of each part of the camera. A lens control circuit 2 drives and controls a motor for adjusting the focus of a photo-taking lens which is not shown and another motor for controlling diaphragm blades. The lens control circuit 2 is arranged to conduct serial communication with the microcomputer 1 through a data bus DBUS while it is receiving a signal LCOM from the microcomputer 1, to obtain motor driving information through the serial communication and to drive and control each of these motors according to the information. The lens control circuit 2 also sends information on the lens of varied kinds (such as a focal length, etc.) through the serial communication to the microcomputer 1.

A liquid crystal display circuit 3 is arranged to drive liquid crystal display devices 11 and 12 for informing the operator of the camera of information of varied kinds, such as a shutter time value, an aperture value, an ISO film sensitivity value, a number of frames of film, etc. The liquid crystal display circuit 3 conducts serial communication with the microcomputer 1 through the data bus DBUS while it is receiving a signal DPCOM from the microcomputer 1. The liquid crystal display circuit 3 drives the liquid crystal display devices 11 and 12 according to display data obtained through the serial communication.

A switch sensing circuit 4 is arranged to read the states of switches which are provided for allowing the operator to set various photographing conditions and to send switch data to the microcomputer 1 by carrying out serial communication with the microcomputer 1 through the data bus DBUS while the switch sensing circuit 4 is receiving a signal SWCOM from the microcomputer 1.

A flash light adjusting control circuit 5 is arranged to control the flashing action of a flash device and a flashing stop function to be performed according to TTL light adjustment. The flash light adjusting control circuit 5 performs various kinds of control by obtaining data relative to flash device control by conducting serial communication with the microcomputer 1 through the data bus DBUS while it is receiving a signal SRCOM from the microcomputer 1.

A focus detecting circuit 6 consists of a line sensor which is provided for AF (automatic focusing) control by a known phase difference detecting method and a circuit unit which is provided for reading information accumulated by the line sensor. The focus detecting circuit 6 operates under the control of the microcomputer 1. A light measuring circuit 7 is arranged to carry out a light measuring action on an object to be photographed and to send the result of light measurement to the microcomputer 1 under the control of the latter. The microcomputer 1 then A/D (analog-to-digital) converts the result of light measurement and uses it in setting exposure conditions, such as an aperture value and a shutter time value.

A shutter control circuit 8 is arranged to control the travel of the leading and trailing blade groups of a shutter which will be described later, in accordance with a control signal from the microcomputer 1. A transport motor control circuit 9 is arranged to control the transport of film (winding and rewinding), according to a signal from the microcomputer 1, and also to control the moving speed of the film, in the event of a slit exposure, to adjust it to a speed set for the slit exposure.

Switches SW1 and SW2 are interlocked with a release button of the camera. When the microcomputer 1 finds the switch SW1 to have turned on, the light measuring and focus detecting actions begin. When the microcomputer 1 finds the switch SW2 to have turned on, an exposure action is allowed to begin. A switch SW3 is arranged to turn on when a slit adapter which will be described later is mounted on the camera. A switch SW4 is arranged to permit selection of a mode of the camera from among a TV priority mode, an AV priority mode, a manual mode, a program mode, etc. A switch SW5 is arranged to permit a selection of the moving speed of a film in a slit exposure mode. A switch SW6 is arranged to have the moving speed of the film to be used in the slit exposure mode displayed by a preview display which will be described later herein.

An X-sync contact is arranged to turn on at the timing of completion of travel of the leading shutter blade group to inform the flash light adjusting control circuit 5 of the timing of flash light emission. An electronic dial 10 is provided for varying a TV value (shutter time value), an AV value (aperture value) or the mode of the camera. The electronic dial 10 is arranged as follows. When the dial 10 is turned while a mode change-over button for the mode selection switch SW4 is pushed, for example, the operating mode of the camera changes from one mode over to another in the order of the TV priority mode, the AV priority mode, the manual mode, the program mode, the TV priority mode, the AV priority mode, etc. This order of changes can be reversed by reversely turning the electronic dial 10. If the TV priority mode has been set by using the mode selection switch SW4 and the electronic dial 10, the TV value can be changed to a desired TV value by turning the electronic dial 10. If the AV priority mode has been set likewise, the AV values can be changed to a desired AV value by turning the electronic dial 10.

Further, when the electronic dial 10 is turned forward or backward with the switch SW5 turned on, the moving speed of the film in the slit exposure mode can be increased or decreased as desired.

The external liquid crystal display device 11 is disposed on the outside of the camera body and is arranged to be driven by the liquid crystal display circuit 3 to show information about the camera of varied kinds. The internal liquid crystal display device 12 is arranged to permit viewing within a viewfinder and to be driven by the liquid crystal display circuit 3 to show information about the camera of varied kinds. In the internal liquid crystal display device 12, a first display part 12a which is of a 7-segment type showing a shutter time value and a second display part 12b which shows an exposure value are disposed in parallel to each other, with the camera held in a normal lateral posture. A third display part 12c consists of a graduation part which is arranged sidewise and a dot-like cursor part which is arranged to indicate a point of the graduation part. The third display part 12c is also disposed in parallel to the first and second display parts 12a and 12b. An in-focus display part 12d is arranged at the right end of the internal liquid crystal display device 12 to show an in-focus state in the automatic focusing.

The third display part 12c is arranged to serve as correction amount display means for showing an exposure correcting amount in the AV priority mode, the TV priority mode and the program mode and as a display means for showing the amount of a difference from an apposite exposure in the manual mode. Further, when the switch SW6 is turned on, the cursor part moves from right to left to show the moving speed of the film to be obtained in the slit exposure mode and thus enables the operator to adjust a film transport speed by turning the electronic dial 10 while watching the cursor part.

Therefore, before taking a shot of a moving object in the slit exposure mode, the operator is able to decide the moving speed of the film which is most apposite to the moving speed of the object by simply operating the electronic dial 10 to adjust the movement of the cursor part to the movement of the object while watching the moving object and the cursor part through the viewfinder. Hereinafter, the display which is arranged to be made in this manner will be called a "preview display".

Figure 2A:
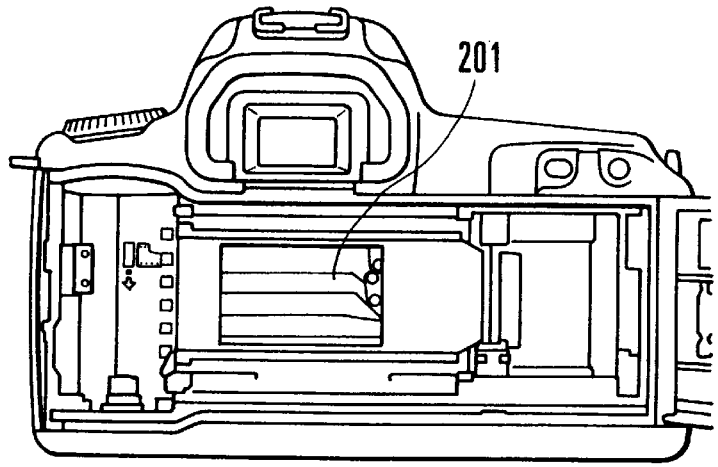
FIGS. 2(A), 2(B) and 2(C) show procedures for mounting a slit adapter on the camera.
Figure 2B:
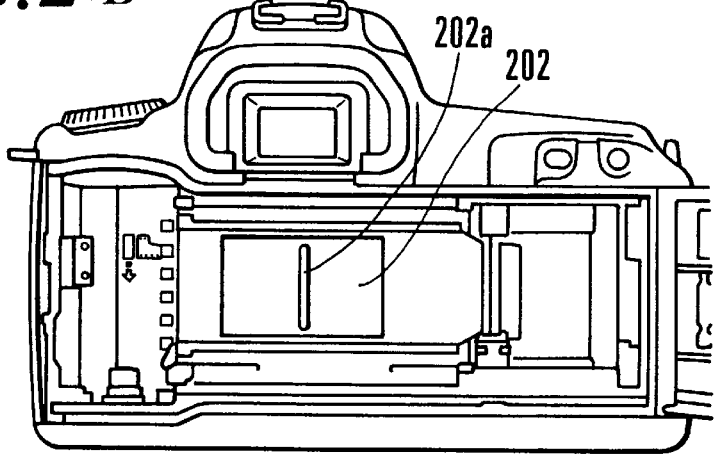
Figure 2C:
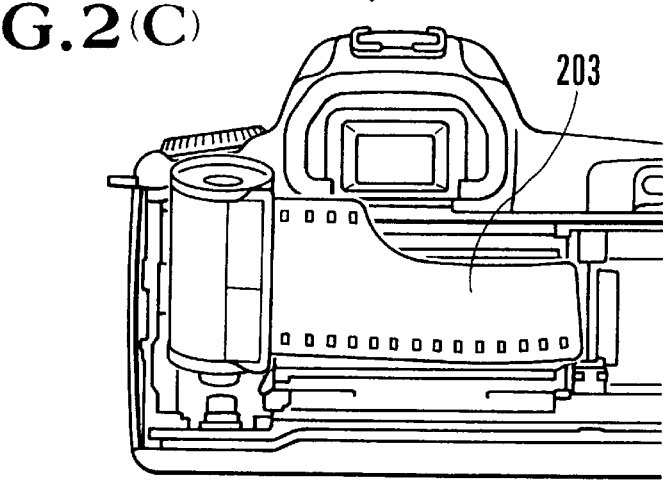

It is necessary for a slit exposure to arrange a slit to be stationary relative to the film surface. To meet this requirement, this embodiment is arranged, as shown in FIGS. 2(A), 2(B) and 2(C), to obtain a stationary slit by securing a slit adapter 202 which has a slit 202a to an aperture formed in the camera body, in such a way as not to hinder the operation of a focal plane shutter 201. The switch SW3 is arranged to turn on when the slit adapter 202 is secured to the aperture. The operating mode of the camera then changes to a mode of carrying out the sequence of actions for a slit exposure. Further, FIG. 2(A) shows the camera in a state in which the slit adapter 202 is not mounted. FIG. 2(B) shows the camera in a state in which the slit adapter 202 is fixed in place. FIG. 2(C) shows the camera in a state in which the camera is loaded with a film after the slit adapter 202 is fixed in place.

Further, in the slit exposure mode, the slit exposure would be impossible if the leading and trailing groups of shutter blades are allowed to travel by forming a certain slit. In the slit exposure mode, therefore, the film is caused to move with the shutter fully opened by allowing the leading shutter blade group to travel and, after the film have been moved to the same extent of breadth as in the case of the ordinary photography, the trailing shutter blade group is caused to travel to complete the exposure. Since the moving distance of the film, in the slit exposure mode, is arranged to be the same as the breadth of the ordinary photographing aperture position, the shot taken in the slit exposure mode can be printed by using standardized printing facilities.

The operation of this embodiment is described with reference to FIG. 3 which is a flow chart as follows.

The flow of operation begins at a step 301. At a step 302, a check is made to find if the release switch SW2 is in an on-state. If not, the flow comes to a step 315 to terminate the flow of operation. If so, the flow comes to a step 303. At the step 303, the switch SW3 is checked to find if it is in an on-state indicating that the camera is in the slit exposure mode, because the switch SW3 turns on when the slit adapter 202 is mounted on the camera as shown in FIG. 2(B). With the camera thus found to be in the slit exposure mode, the flow comes to a step 309 for the slit exposure photography. If the camera is found to be in the ordinary photographing mode, the flow comes to a step 304. The on-state or off-state of the switch SW3 is found through communication between the switch sensing circuit 4 and the microcomputer 1.

In the ordinary photographing mode, a mirror is moved upward at the step 304. At a step 305, the leading shutter blade group is allowed to travel by the shutter control circuit 8. At a step 306, after the lapse of a shutter time which is apposite to the value of light measured by the light measuring circuit 7, the trailing shutter blade group is allowed to travel by the shutter control circuit 8. At a step 307, the mirror is moved downward. At a step 308, a shutter charging action is performed on the shutter. At the same time, the aperture of the lens is caused to be fully opened through communication with the lens control circuit 2 and a one-frame portion of the film exposed is transported forward to make the camera ready for a next shot.

Figure 7:
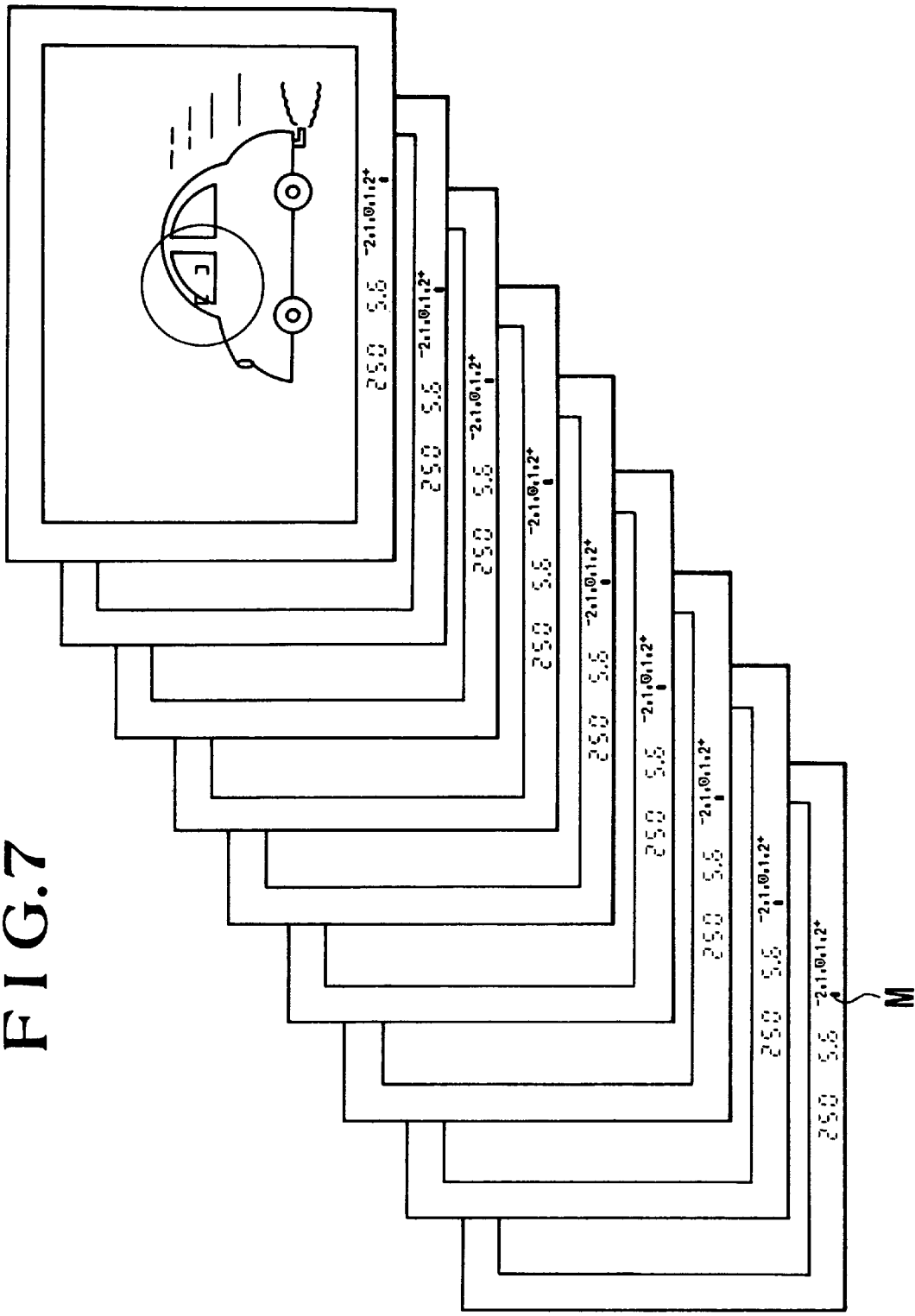
FIG. 7 shows a preview display.

In the case of the slit exposure mode, the slit exposure photography is executed in the following manner. At the step 309, the mirror is moved up. At a step 310, the aperture is caused to be stopped down through communication with the lens control circuit 2. The leading shutter blade group is allowed to travel to bring the shutter into a full open state. At a step 311, a shot is taken in the slit exposure mode by causing a one-frame portion of the film to be transported at the moving speed of the film set by the operator. As shown in FIG. 7, the moving speed of the film can be recognized through the movement of the cursor M. The moving speed of the film is set by operating the switch SW5 and the electronic dial 10 while watching the preview display, as mentioned in the foregoing.

At a step 312, after the one-frame portion of the film is moved for the slit exposure, the trailing shutter blade group is allowed to travel. At a step 313, the mirror is moved down. At a step 314, the shutter is charged. At the same time, the aperture of the lens is caused to be fully opened through communication with the lens control circuit 2. A portion of the film between frames is transported for a next shot to be taken in the slit exposure mode.

Figure 4:
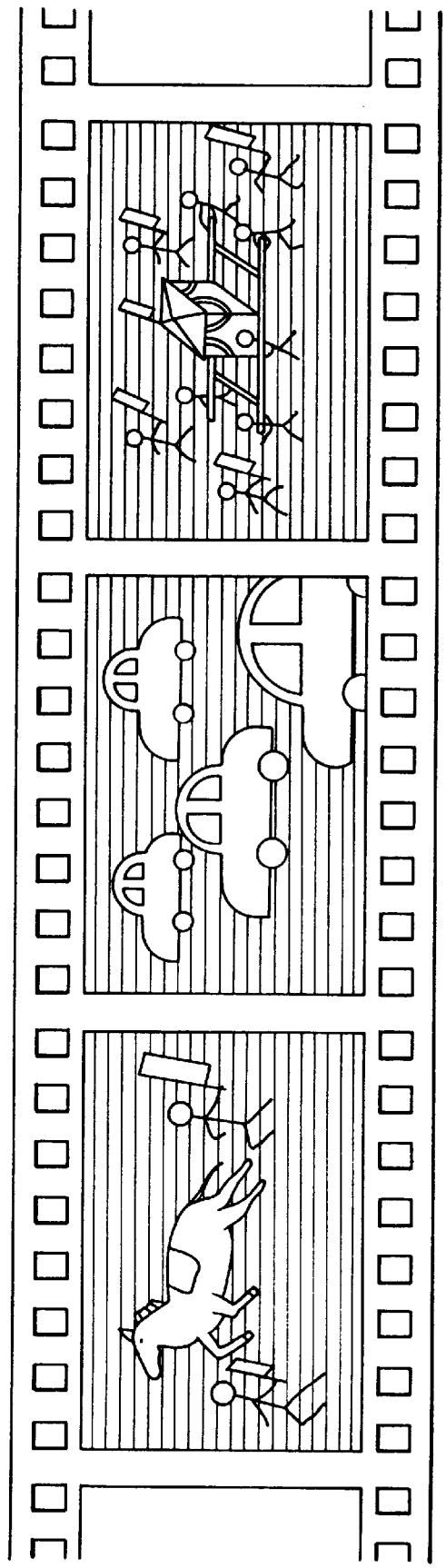
FIG. 4 shows the states of scenes photographed by a slit exposure action shown in FIG. 3.

Images obtained on the film through the above-stated sequence of actions in the slit exposure mode are imprinted, as shown in FIG. 4, on the film leaving the same distance between frames and at the same frame length as the images obtained in the ordinary photographing mode. Therefore, the images obtained in the slit exposure mode can be printed by ordinary standardized printing service facilities.

Figure 5:
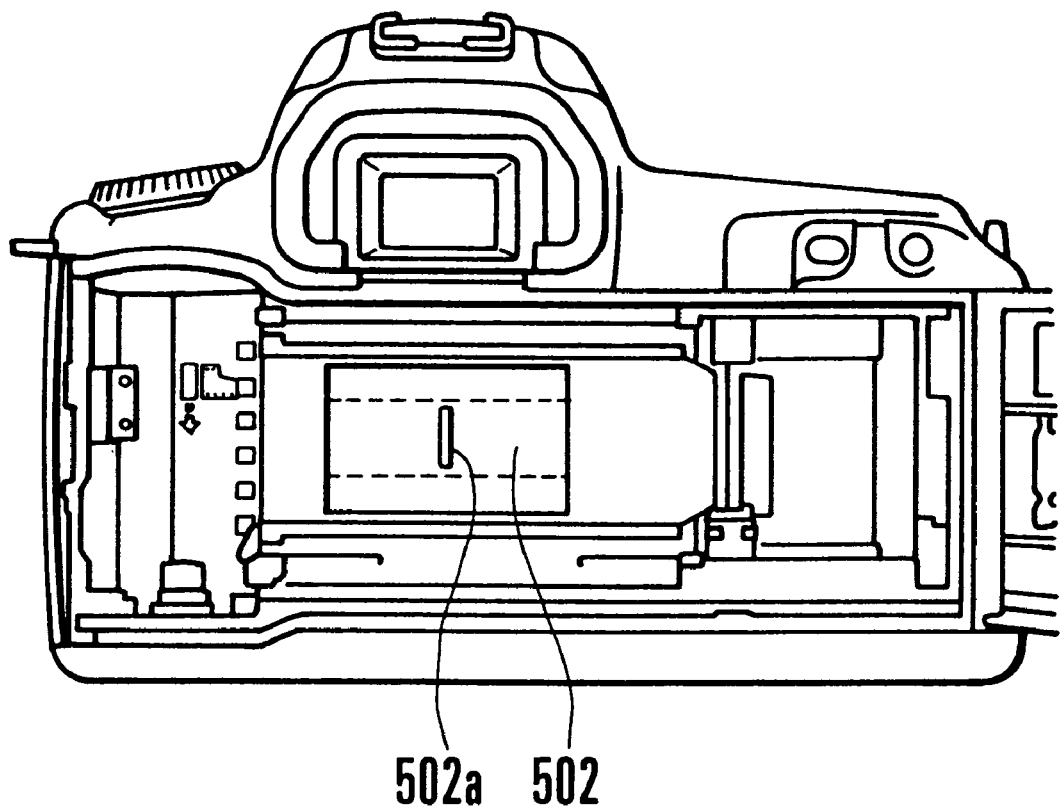
FIG. 5 shows another example of the slit adapter arranged according to this invention.
Figure 6:
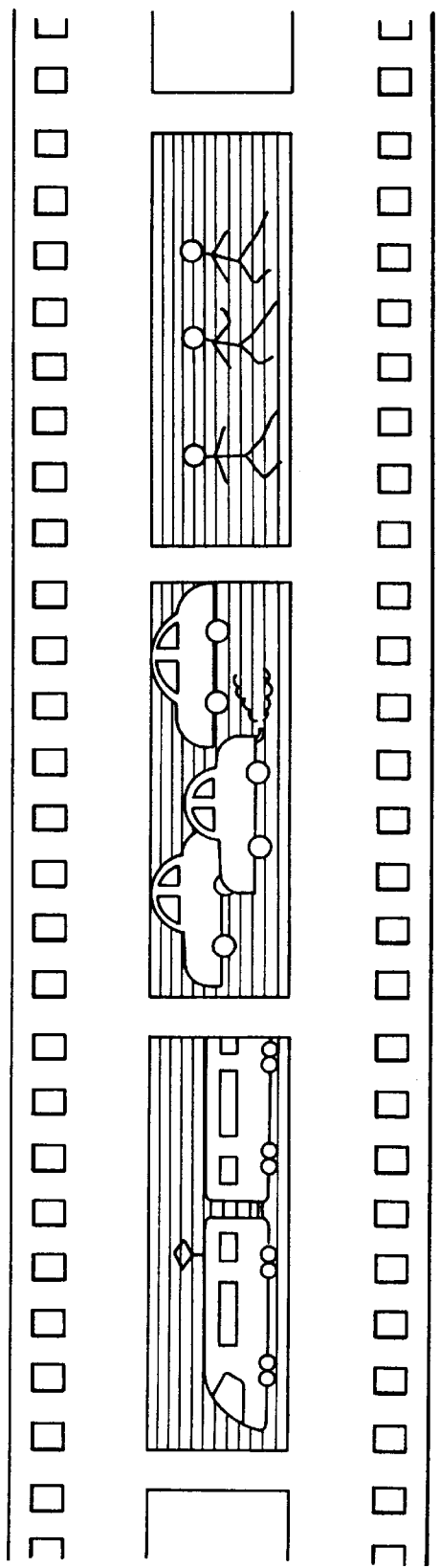
FIG. 6 shows the states of scenes photographed by using the slit adapter shown in FIG. 5.

The embodiment described above is arranged to make a slit exposure in an ordinary picture size which is 24×36 mm. However, as shown in FIG. 5, the camera may be arranged to make the slit exposure in a panorama picture size by bringing the vertical length of a slit 502a of a slit adapter 502 to be secured to the camera body to a size of about one half of the ordinary vertical length (24 mm). In the case of FIG. 5, images are imprinted in the slit exposure mode with their upper and lower parts cut off as shown in FIG. 6. This modification enhances the expressional effect of the slit exposure and permits effective utilization of panorama printing and "high-vision" printing services.

Figure 8:
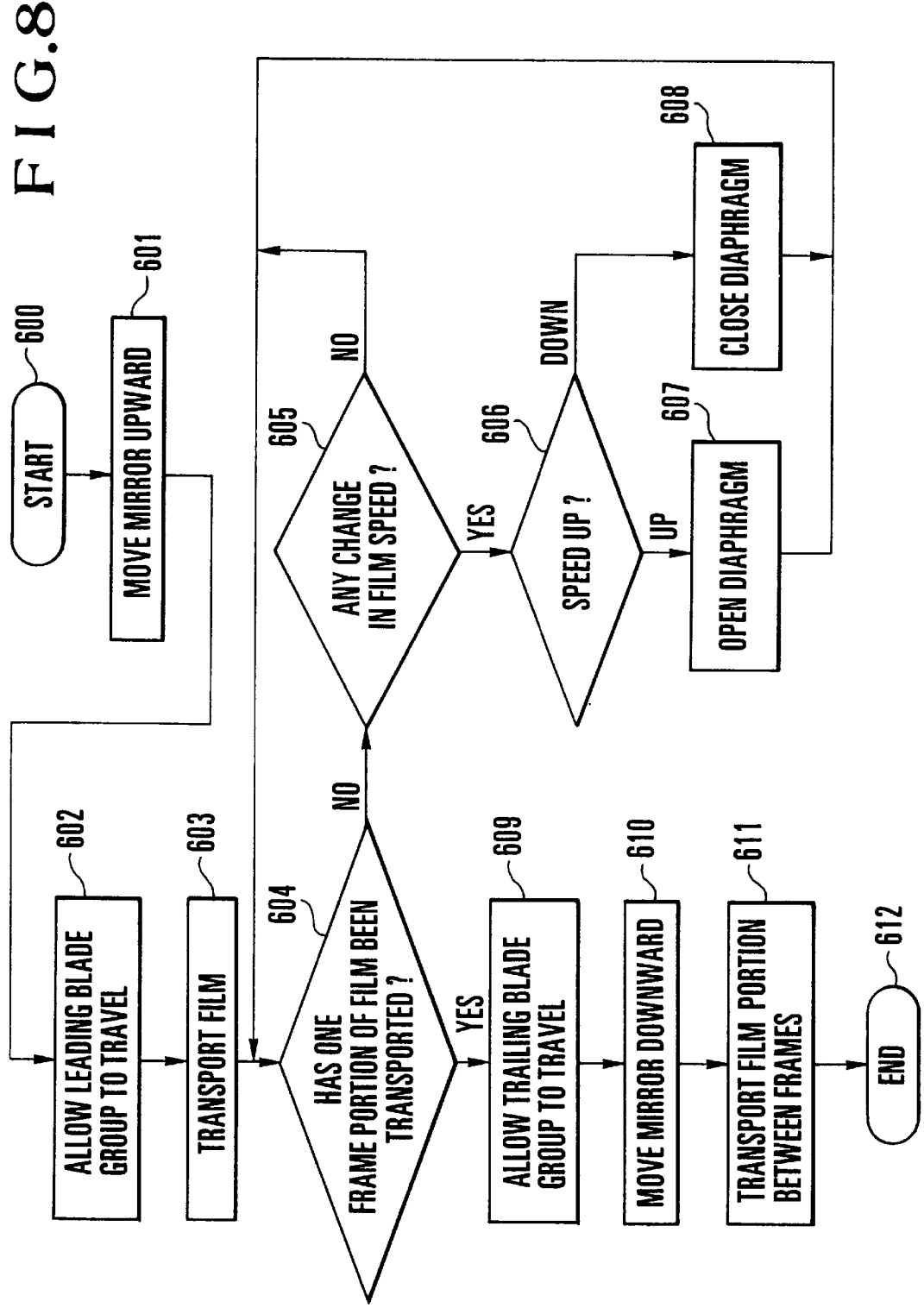
FIG. 8 is a flow chart showing a second example of operation of the camera shown in FIG. 1.

FIG. 8 is a flow chart showing the operation of another embodiment of this invention which is arranged to make an exposure of a film surface constant in the event of any change of the moving speed of the film while the slit exposure is in process.

Figure 3:
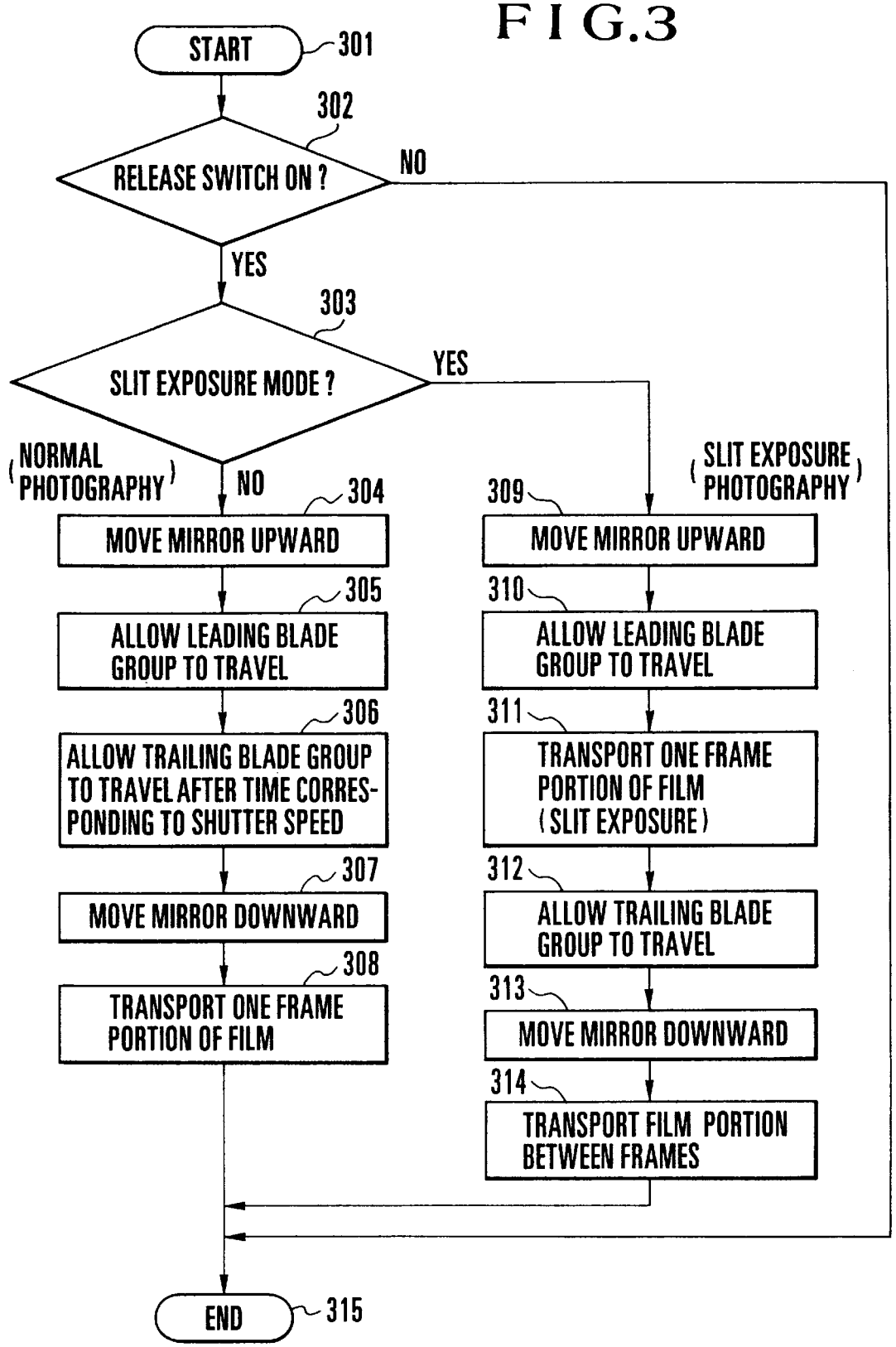
FIG. 3 is a flow chart showing a first example of operation of the camera arranged as shown in FIG. 1.

Referring to FIG. 8, at steps 601, 602 and 603, the mirror is moved up, the loading shutter blade group is allowed to travel and the film is moved for the slit exposure photography, in the same manner as at the steps 309, 310 and 311 of FIG. 3. After the step 603, the flow of operation proceeds to a step 604. In the meantime, the diaphragm aperture of the lens is stopped down by the lens control circuit 2 to an extent which corresponds to AV (aperture value) control. At the step 604, a check is made to find if the film has been moved for the slit exposure to an extent corresponding to one frame. If so, the flow comes to steps 609, 610 and 611 to execute the same actions as the steps 312, 313 and 314 of FIG. 3. If the film is found to have not been moved to the extent of one frame as yet at the step 604, the flow comes to a step 605. At the step 605, a check is made to find if the moving speed of the film has changed from a set value. The film moves at a speed set by the transport motor control circuit 9. The movement of the film is detected by known optical or mechanical film transport detecting means through a perforation provided in the film and the speed of the movement is computed by film speed computing means.

In the case of the slit exposure photography, the shutter speed is determined by the width of the slit provided in the slit adapter and the moving speed of the film. In a case where the aperture value is fixed, if the moving speed of the film is caused to change, for example, by a variation of mechanical load, this change of the moving speed of the film is equivalent to a change of the shutter speed in the ordinary photography and prevents obtaining an apposite exposure effect on the film surface.

In the case of this embodiment, this problem is solved by changing the diaphragm aperture of the lens according to any change of the moving speed of the film in such a way as to optimize the amount of exposure effected on the film surface. If the moving speed of the film is found to have changed at the step 605, the flow comes to a step 606. At the step 606, a check is made to find if the moving speed of the film is faster than the set speed. If so, the flow comes to a step 607 to open the diaphragm to an extent corresponding to an increase of the moving speed of the film, in such a way as to increase the amount of exposure to an apposite amount. If the moving speed of the film is found to have dropped at the step 606, the flow comes to a step 608 to close the diaphragm (to stop down the aperture) to an extent corresponding to the drop of the moving speed of the film, in such a way as to decrease the amount of exposure to an apposite amount.

The embodiment described above is arranged to vary the aperture of the diaphragm for an apposite amount of exposure when the moving speed of the film changes. However, this arrangement may be changed to vary the width of the slit aperture of the slit adapter instead of varying the diaphragm aperture.

In accordance with the arrangement of each of the embodiments described above, each frame of picture taken in the slit exposure mode can be arranged to have the same width as that of the frame of picture taken in the ordinary photographing mode. The pictures taken in the slit exposure mode, therefore, can be printed by ordinary standardized printing facilities.

Further the moving speed of the film, in the slit exposure mode, can be set by adjusting it to the movement of the object while viewing the object. Therefore, the moving speed of the film can be set without difficulty. Besides, even in the event of any change of the moving speed of the film, the slit exposure photography can be carried out without any uneven exposure by varying, for example, the aperture according to the change of the moving speed of the film.

What is claimed is:

1. A camera, comprising:
 a) a shutter operation device for operating a shutter;
 b) a film transport motor device for supplying a drive source for transporting a film;
 c) an exposure control device for performing a first exposure operation and a second exposure operation, said first exposure operation being performed by stopping the film at a predetermined position by controlling and stopping the film transport motor device, and opening the shutter by controlling the shutter operation device while the film is stopped at the predetermined position, said second exposure operation being performed by transporting the film at a predetermined speed by controlling the drive of the film transport motor device, and opening the shutter by controlling the shutter operation device while the film is transported at the predetermined speed; and
 d) a selection device for selecting the first exposure operation or the second exposure operation.

2. A camera according to claim 1, wherein said selection means selects said second control mode upon detection that a member having a slit has been attached to said camera.

3. A camera according to claim 1, wherein when the second exposure operation is performed by the exposure control device, the amount of the film transport at the predetermined speed while the shutter is open is equal to a length of an exposure range in the film transport direction in said first exposure operation.

4. A camera according to claim 1, wherein said exposure control device controls said shutter operation device to close said shutter after performing the second exposure operation and controls said film transport motor device so as to feed a predetermined amount of film under the shutter closed condition.

5. A camera, comprising:
 a) a control device for performing a slit exposure by moving a film; and
 b) a display device having plural segments, display forms of said plural segments being varied in response to the movement of the film for slit exposure.

6. A camera according to claim 5, wherein said display is arranged to be made within a viewfinder and to be viewable together with an image of an object to be photographed.

7. A camera according to claim 5, wherein said control device is able to perform a second exposure operation with the film being stopped and said display device displays different information of the exposure at the time of the second exposure operation.

8. A camera according to claim 5, wherein said display device changes the position of a segment of the plural segments which is illuminated, according to the movement of the film.

9. A camera according to claim 5, further comprising varying means for varying the moving speed of the film.

10. A camera according to claim 9, wherein said varying means is arranged to vary the moving speed of the film in response to an operation performed on an external operation member.

11. A camera according to claim 10, wherein said external operation member is arrange to be used also for varing information on an exposure action of the camera.

* * * * *

UNITED STATES PATENT AND TRADEMARK OFFICE
CERTIFICATE OF CORRECTION

PATENT NO. : 5,937,211
DATED : August 10, 1999
INVENTOR(S) : Hiroshi Matsushima

It is certified that error appears in the above-indentified patent and that said Letters Patent is hereby corrected as shown below:

Col. 8, line 36, delete "arrange" and insert --arranged--.

Col. 8, line 36, delete "varing" and insert --varying--.

Signed and Sealed this

Twentieth Day of March, 2001

Attest:

NICHOLAS P. GODICI

*Attesting Officer*     Acting Director of the United States Patent and Trademark Office